United States Patent [19]

Carr

[11] Patent Number: 5,056,588
[45] Date of Patent: Oct. 15, 1991

[54] EVAPORATIVE COOLING ENHANCED COLD STORAGE SYSTEM

[75] Inventor: Peter Carr, Cary, N.C.
[73] Assignee: Instatherm Company, Cary, N.C.
[21] Appl. No.: 635,301
[22] Filed: Dec. 28, 1990
[51] Int. Cl.$^5$ ............................................. F28D 20/00
[52] U.S. Cl. ...................................... 165/10; 165/42; 165/104.11; 62/90; 62/91; 62/93
[58] Field of Search ................. 165/10, 18, 42, 104.11; 62/430, 91, 92, 93, 406

[56] References Cited

U.S. PATENT DOCUMENTS

| | | | |
|---|---|---|---|
| 2,723,083 | 11/1955 | Bary | 165/10 |
| 4,403,644 | 9/1983 | Hebert | 62/430 |
| 4,556,100 | 12/1985 | Whitman | 165/10 |
| 4,761,967 | 8/1988 | Sumikawa et al. | 165/42 |

FOREIGN PATENT DOCUMENTS 51512  3/1982  Japan ...................................... 165/42

Primary Examiner—Albert W. Davis, Jr.
Attorney, Agent, or Firm—Bell, Seltzer, Park & Gibson

[57] ABSTRACT

The invention provides an evaporatively enhanced cold storage system wherein a warm air stream is cooled and the cooled air stream is thereafter passed into contact with a cold storage unit. Moisture is added to the cooled air stream prior to or during contact of the cooled air stream with the cold storage unit to effect enhanced cooling of the cold storage unit due to evaporation of all or a portion of the added moisture. Preferably at least a portion of the added moisture comprises water condensed during the cooling of the warm air stream.

40 Claims, 2 Drawing Sheets

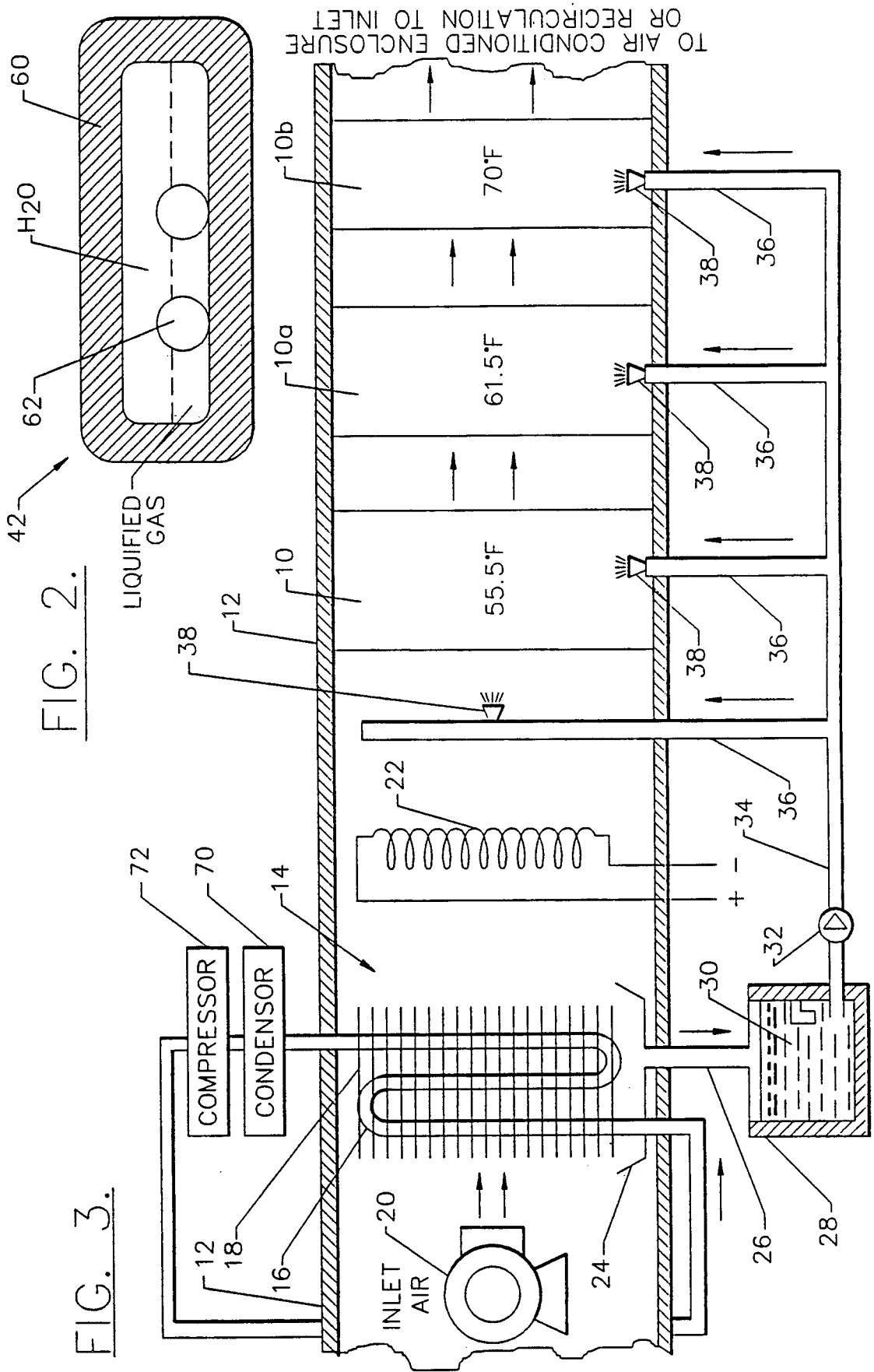

EVAPORATIVE COOLING ENHANCED COLD STORAGE SYSTEM

This invention was made with Government Support under Grant DE-FG01-89CE15449 awarded by the Department of Energy. The Government has certain rights in this invention.

FIELD OF THE INVENTION

The invention relates to cold storage systems and more particularly to air conditioning systems having cold storage capacity.

BACKGROUND OF THE INVENTION

Cold storage systems have been proposed for various purposes. In building air conditioning systems, cold storage systems have been proposed for shifting power consumption from peak demand periods to off-peak periods. The cold storage medium is incorporated into an air conditioning system and cooled by operation of the air conditioning system during off-peak hours. The cold storage medium, itself, is then used to cool the building during peak hours.

It is also been proposed to incorporate cold storage systems into automotive air conditioning systems. As with the building systems, the cold storage medium is disposed in the air conditioning system, and is cooled during operation of the air conditioning system. The cold storage medium, itself, is then used to cool the interior of the vehicle when power demand on the vehicle engine is high, as for example, when the vehicle is climbing a hill, or when the vehicle is parked with the engine not running.

Various types of media have been proposed as cold storage media including water and/or ice, brine and the like. Particularly desirable as cold storage media are those systems which change phases between solid, liquid and/or gas thereby employing the phase transition energy for thermal storage. These systems include pure compounds, such as formic acid, inorganic hydrates or eutectic inorganic hydrates, such as for example, sodium chloride—sodium sulphate decahydrate; and the like.

Particularly desirable phase change thermal storage media for commercial air conditioning systems are those materials known as gas hydrates disclosed in, for example, U.S. Pat. No. 4,540,501 to Ternes et al. Gas hydrates are non-stoichiometric crystalline solids classed as clathrate compounds. More particularly, gas hydrates are solid crystalline structures with the gas molecules trapped within the ice-type lattice. The trapped gas lends stability to the structure, which permits most such hydrates, which are principally water, to exist as a solid at temperatures well above the 32° F. freezing point of water. The melting or reversible decomposition of such gas hydrates in a sealed tube requires a heat input of approximately 120 Btu/lb. This is similar to the cold storage capacity of ice/water transition (144 Btu/lb); but, with gas hydrates, this capacity is deliverable at temperatures within the range of conventional air conditioning systems. Despite these advantages, actual use of gas hydrates as cold storage media has been discouraged by the fact that formation of the hydrate requires temperatures much lower than its transition temperature, particularly when all of the hydrate has been decomposed and none remains in the medium.

A thermal storage gas hydrate system which provides for advantageous hydrate formation at temperatures at or only slight below the gas hydrate transition temperature is disclosed in U.S. Pat. No. 4,922,998 to Carr, issued May 8, 1990. In this system, a movable mechanical device is mounted for free movement within a container containing the gas hydrate and thereby facilitates hydrate formation at more desirable temperatures.

In the known cold storage air conditioning systems, the cooling of the cold storage medium is often achieved by indirect heat exchange between the cold storage medium and the air conditioning system. For example, air which has been cooled by the air conditioning system cools the cold storage medium by indirect heat exchange.

In the commercial air conditioning systems, including vehicle and building air conditioning systems which have been proposed for use with cold storage media, a proportion of the cooling load is used to condense water out of input air as it is cooled. This water is typically discarded as a waste product of the operation, although in some air conditioning systems, such as that disclosed in U.S. Pat. No. 4,406,138 to Nelson, the condensed water is used to enhance the efficiency of the air conditioning condensing unit by spraying of the condensed water onto the condensing coils.

U.S. Pat. No. 4,018,060 to Kinsell et al proposes a system for improving the efficiency of an aircraft air conditioning system. According to this disclosure, ambient air is drawn into a turbine for expansion and cooling. The air passes through a heat exchanger where it withdraws heat from recirculated cabin air. Water can be sprayed into the low pressure air at the heat exchanger to provide additional cooling by evaporation.

U.S. Pat. No. 4,440,698 to Bloomer discloses an apparatus for ensuring heat exchange between a gas flow and a heat exchanger and which is proposed for use in recovery of heating or cooling energy from industrial process exhaust, such as for the recovery of energy from air exhausted from an air conditioned building. According to this proposal, the heat exchanger is mounted in a duct with constrictions for the gas flow arranged in the duct such that jets of gas are created. Liquid is sprayed within the duct and the gas jets pick up the liquid and carry it onto the heat exchanger surface thereby thoroughly wetting the heat exchanger. When the heat exchanger contains a medium to be cooled, evaporation of the liquid on the heat exchanger absorbs heat from the heat exchanger coils.

Energy efficiency improvements are particularly desirable in air conditioning systems which include cold storage medium because cooling of the cold storage medium can add substantially to the cooling load on the air conditioning system. Moreover, when the phase transition type cold storage media are employed, the phase transition temperature of the media may be close to the temperature of the air conditioned air and a substantial amount of heat exchange can therefore be required in order to effect phase transition of the cold storage media.

SUMMARY OF THE INVENTION

The invention provides methods and apparatus for enhancing cold storage air conditioning systems. In its various embodiments, the invention can improve the efficiency of cold storage systems, can provide phase change cold storage at higher incoming air temperatures and/or can increase the rate of heat transfer to cold storage medium.

In one embodiment, the invention provides an air conditioning process in which a warm air stream is cooled and the cooled air stream is thereafter passed into contact with a unit containing a cold storage medium which is at a temperature the same as or greater than the temperature of the cooled air stream. Moisture is added to the cooled stream prior to or during contact of the cool air stream with the cold storage unit. Enhanced cooling of the unit containing the cold storage medium is effected because all or a portion of the added moisture is vaporized, thereby absorbing heat from the cold storage unit. In a normal air conditioning system, the air conditioned supply air cannot normally be used to effect evaporative cooling because the air conditioned supply air has typically been cooled sufficiently to cause moisture condensation and thus the air is normally at or near 100% relative humidity. However, the system of the present invention makes advantageous use of the potential for evaporative cooling which is brought about by heat exchange with the warmer thermal storage medium. In preferred embodiments of the invention, the moisture which is added to the cooled air stream, i.e. the air conditioned stream, can be provided by using condensate collected from the air conditioning cooling coils. The condensate is preferably collected from the air conditioning cooling coils and passed to the cold storage unit via an insulated recovery and delivery line to take full advantage of the fact that the condensate water is also cold. A separate water supply may be used in lieu of or in combination with the condensate supply to provide the added moisture.

In another advantageous embodiment of the invention, the cold storage air conditioning system of the invention is provided as a vehicle air conditioning and cold storage system. In conventional vehicle air conditioning systems, temperatures are controlled by the reheat principal in which all air is passed through the air conditioning cooling coils and cooled to the lowest temperature in the system. When the driver elects to warm the air entering the system, the warmer temperature setting simply diverts some of the cold air through the heater module for rewarming. The cold storage system of this invention is particularly advantageous as a vehicle air conditioning and cold storage system because rewarming of all or a portion of the air conditioned air increases the capacity of the air to absorb moisture. Thus, even though heating of the air may bring the air temperature close to or even up to the temperature of the cold storage unit, enhanced cooling of the cold storage unit is effected by the addition of moisture to the reheated, air conditioned air to thereby effect cooling of the cold storage medium in whole or part by evaporative cooling.

In particularly preferred embodiments of this invention, the cold storage medium is a phase change cold storage medium and is most preferably a gas hydrate cold storage medium. When a gas hydrate cold storage medium is used, a mechanical device advantageously can be employed within the cold storage unit to facilitate formation of the gas hydrate at or below the transition temperature as disclosed in U.S. Pat. No. 4,922,998, issued May 8, 1990 to Peter Carr, the disclosure which is hereby incorporated by reference. Because in accordance with this invention, evaporative cooling is employed for all or a portion of the cooling of the gas hydrate storage unit, gas hydrate phase change can be accomplished at air temperatures which are higher than the temperatures at which nucleation or phase change can occur when air cooling, alone, is used for cooling of the thermal storage unit.

BRIEF DESCRIPTION OF THE DRAWINGS

In the drawings which form a portion of the original disclosure of the invention:

FIG. 2 is an enlarged fragmentary view of a preferred gas hydrate chamber used in the invention; and FIG. 3 is a schematic illustration of another preferred embodiment according to the invention wherein a cascaded cold storage system is employed.

DETAILED DESCRIPTION OF THE PREFERRED EMBODIMENTS

Figure 1:
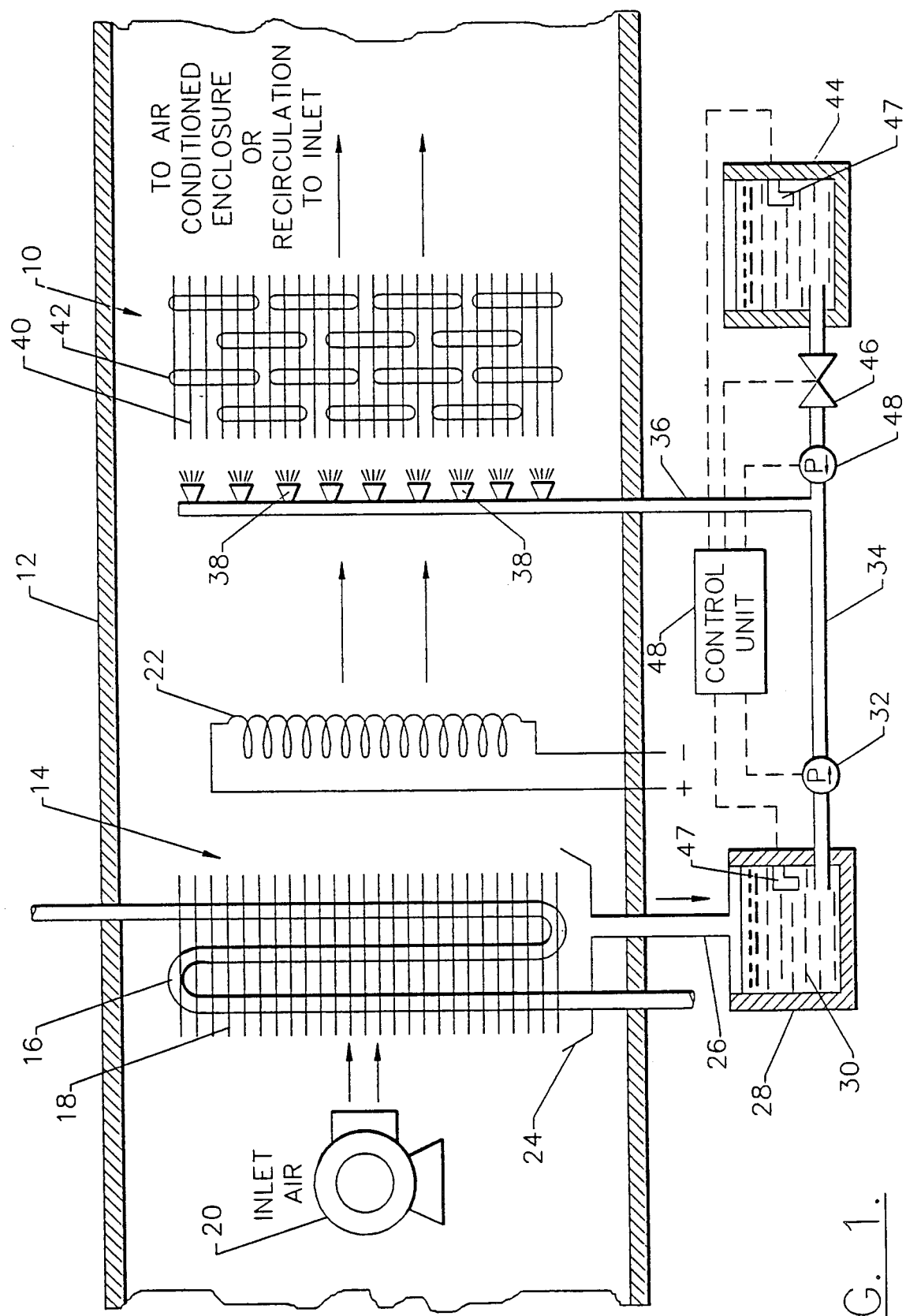
FIG. 1 is a schematic illustration of an air conditioning cold storage system according to one embodiment of the invention.

In the following detailed description, various preferred embodiments of the invention are described in order to illustrate the invention and to enable practice of the invention. It will be understood however that the invention is not limited to its preferred embodiments; but to the contrary, the invention includes various alternatives, modifications and equivalents within its spirit and scope as will be apparent to the skilled artisan.

FIG. 1 illustrates one preferred embodiment of the invention. A cold storage unit 10 is positioned within an insulated air duct 12 downstream of an air conditioning cooling unit 14. The cooling unit 14 is a conventional unit and includes a cooling coil 16 surrounded by heat exchange fins 18. A conventional fan 20 supplies inlet air across the cooling unit 14 and past an optional heating unit 22 and then to the cold storage unit 10. Air conditioned air is recovered from the downstream end of the cold storage unit 10 and supplied by air duct 12 to an air conditioned enclosure such as a vehicle enclosure, for example, the enclosure of a car, a truck, a recreational vehicle or the like, or to a building enclosure. During periods of low cooling demand, the air conditioned air can be recirculated to the inlet one or more times prior to being supplied to an air conditioned enclosure.

Inlet air passed by fan 20 across cooling coils 14 will typically have a moisture content such that the dew point temperature of the inlet air is higher than the temperature of the cooling unit 14. Accordingly, as the inlet air is passed across cooling unit 14, moisture condenses as liquid and is collected as condensate in a conventional collection unit 24 which may be a drip pan. The collected moisture from collection unit 24 is passed via an insulated line 26 to an insulated reservoir 28. The condensate 30 which is collected in reservoir 28 is thus maintained at or near the temperature of cooling unit 14.

The collected condensate 30 is passed via a conventional liquid pump 32 through insulated delivery lines 34 and 36 to one or more spray or injection nozzles 38 which are disposed to inject moisture into the moving, cooled air stream or onto the cold storage collection unit 10. Advantageously, cold storage unit 10 can include a plurality of heat exchange fins 40 or similar heat exchange surface surrounding a plurality of separate cold storage units 42.

In the embodiment illustrated in FIG. 1, a plurality of spray nozzles are shown directing moisture onto cooling fins 40 of cold storage unit 10 with the nozzles 38 being arranged in a single linear row. It will be recognized that various configurations can be provided for adding moisture to the moving, cooled air stream or for spraying moisture onto the cold storage unit. For example, the plurality of spray nozzles 38 can be replaced by a single wide angle spray nozzle or the moisture supply unit can be positioned above the cold storage unit 10 and arranged to drip water onto the fins 40 of cold storage unit 10.

As air which has been cooled and typically dehumidified by a passage across cooling unit 14, is passed into heat exchange contact with thermal storage unit 10, all or a portion of the moisture which is added via nozzles 38 will be vaporized and thereby absorb heat from cold storage unit 10. If the moisture is provided as a spray directly onto the cold storage unit 10, vaporization of the liquid is accomplished directly on the surface of the cooling unit. If all or a portion of the moisture is added to the cooled air stream at a location upstream of the cold storage unit 10, a portion of the moisture may vaporize upon contact with the cooled air stream and a portion may vaporize upon contact with the cold storage unit 10. In any event, enhanced cooling of the cold storage unit 10 is effected by addition of the moisture through nozzles 38, since in one case, evaporative cooling directly in the cooled air stream lowers the temperature of the air stream, while in the other case, heat is absorbed directly from the cold storage unit by the vaporizing moisture.

Returning to FIG. 1, a second liquid reservoir 44 is shown which may be provided in addition to, or in lieu of condensate reservoir 28. Reservoir 44 contains water which can be supplied from an outside source (not shown), such as by a continuous and automatically supplied water line or by periodically manually filled tank. It will be recognized that condensate water collected in reservoir 30 is advantageously used in lieu of the water from reservoir 44 because the condensate water will be at the temperature of the cooling unit 14. Reservoir 44 is connected via a conventional valve 46 and a conventional pump 48 to supply line 36 which supplies the liquid to nozzles 38.

Advantageously, reservoir 30 and optional reservoir 44 each contain a conventional liquid level sensor 47 which communicates via electrical lines with a conventional control system 48. If the liquid level in the reservoir drops below a certain predetermined level, the control unit automatically turns off the associated pump. When two liquid reservoirs are employed as illustrated in FIG. 1, control unit 48 can be employed to preferentially supply liquid from reservoir 28. Thus, so long as there is liquid present in cold condensate reservoir 28, the cold liquid condensate 30 is supplied to nozzles 38 without addition of water from reservoir 44. If the condensate level in reservoir 28 drops below a certain predetermined level, control unit 48 automatically opens valve 46 and actuates pump 48 so that liquid is supplied to nozzles 38 from reservoir 44. When sufficient condensate has collected in reservoir 28 so that the liquid has risen above the predetermined level, control unit 48 automatically closes valve 46 and turns off pump 48 so that the cold condensate is supplied solely from reservoir 28 to nozzles 38.

When used as a vehicle air conditioning cold storage system, the system of the invention will typically include a heating means such as heating coil 22 to upwardly adjust the temperature of all or a portion of the air which has been cooled by cooling unit 14. Although heating coil 22 is schematically illustrated in FIG. 1 as being positioned linearly between cooling unit 14 and cold storage unit 10, the skilled artisan will recognize that the heating unit will typically be positioned within a bypass portion of the main duct. Similarly, although the heating unit is shown as an electrical coil, heating unit 22 may consist of a hot engine or engine fluid.

Returning to FIG. 1 the cold storage unit of the invention is advantageously be placed downstream of the heating unit 22. As the cooled air stream, existing from the cooling unit 14, is heated (or as a portion of the stream is heated) by the heating unit 22, excess moisture vaporization capacity is created in the air stream. The system of this invention recognizes and makes use of this excess moisture vaporization capacity to cool the cold storage unit 10. This can provide significant advantage as compared to prior art systems. For example, the air entering and exiting the cooling unit 14 can have been cooled substantially below the phase change temperature of the phase medium in cold storage unit 10. However, if reheating or reheat blending by heating unit 22 has heated the air to a temperature of at or close to the phase change temperature of the media in cold storage unit 10, then cold storage by phase change might not occur in the cold storage unit 10 using air exchange alone. By adding moisture to the reheated or partially reheated air, evaporative cooling can absorb sufficient heat from the cold storage unit 10 to provide phase change of the cold storage media.

The air conditioned air containing added, vaporized moisture is then passed to an air conditioned enclosure. As indicated previously, during periods of low cooling demand, all or a portion of the cooled air may be recycled to the inlet and again through the system for charging of the cold storage unit once or several times prior to being passed to the air conditioned enclosure.

FIG. 2 illustrates one preferred type of cold storage device which can be used when an array of separate cold storage units 42 are employed in the cold storage unit 10 of FIG. 1. In this preferred embodiment of the invention, each separate cold storage unit 42 comprises an elongate sealed container 60 containing water and a liquified gas capable of forming a gas hydrate with the water together with a movable means in the form of two freely movable balls 62. The sealed containers can also include an emulsifying agent to maximize dispersion of the liquified gas and the water phases. When the system is operational, cool air from the air conditioning system contacts container 60 and will cool the interior of unit 42 by indirect heat exchange causing the formation of the solid gas hydrate within the interior of the container 60. Movement of freely movable balls 20 within the container facilitates the formation of the gas hydrate at or near the phase change temperature. It will be understood that the movement of balls 20 can be effected in various ways. For example, normal movement of a vehicle can create the motion of the two balls 20 in each container 60 causing them to contact the walls of the container and each other, thereby facilitating formation of the gas hydrate. A separate moving means such as a magnetic field can also be used to impart motion to the two balls 20.

Gas hydrates used in preferred embodiments of the invention can be formed by placing the selected gas and water into a sealed container in a ratio of about 1 mole gas to 8 to 17 moles of water, with the exact ratio depending on the hydrate formed and the system requirements. Upon cooling of the sealed container to below the upper transition point of the gas hydrate, a gas hydrate will be formed. Mixtures of gases can also be used to provide different temperatures and pressures than those achievable from the individual gases.

A listing of upper transition temperatures for a number of gas hydrates is shown in the table below. These examples illustrate the wide variety of gases for which hydrates are known, and a partial listing of the invariant points which are obtainable.

TABLE I

| Upper Invariant Point | | |
| --- | --- | --- |
| Temperature (°F.) | Pressure (psia) | Gas |
| 49.8 | 653 | $CO_2$ |
| 49.8 | 40 | $CHBrF_2$ |
| 50 | 24.5 | $CBrClF_2$ |
| 53.6 | 603 | $N_2O$ |
| 53.6 | 18 | $CH_3SH$ |
| 53.8 | 34 | $SO_2$ |
| 53.8 | 63 | $CCl_2F_2$ |
| 55.6 | 33.5 | $CH_3CClF_2$ |
| 57.2 | 293 | $SF_6$ |
| 58.5 | 492 | $C_2H_6$ |
| 58.5 | 22 | $CH_3Br$ |
| 58.8 | 63 | $CH_3CHF_2$ |
| 59.0 | 485 | $C_2H_2$ |
| 61.2 | 82 | Cyclopropane |
| 61.3 | 112 | $CHClF_2$ |
| 64.2 | 42 | $CH_2ClF$ |
| 65.8 | 470 | $CH_3F$ |
| 68.9 | 72 | $CH_3Cl$ |
| 73.0 | 118 | $C_2H_5F$ |
| 77.0 | 38 | $BrCl$ |
| 82.9 | 123 | $Cl_2$ |
| 82.9 | 257 | $AsH_3$ |
| 85.1 | 325 | $H_2S$ |
| 86.0 | 162 | $H_2Se$ |

Any of various emulsifying, surfactants or wetting agents can, also, be included to promote mixing of the gas or gas hydrate and water. These can include polyglycerol oleate materials such as decaglycerol tetraoleate (available as CAPROL 106-40 from Capital City Products) and perfluroalkyl ethoxylate (ZONYL, Dupont), both of which have shown improved mixing and hydrate formation; sorbitan monoisostearate (available as CRILL 6 from Croda, Inc.) which appeared to have a more limited effect, and the like. Other surfactants to promote hydrate formation are set forth in U.S. Pat. No. 4,821,794 to Tsai et al which is incorporated herein by reference.

Thermal storage media other than gas hydrates can also be used in the present invention in combination with or in lieu of the preferred gas hydrate cold storage media. Such cold storage media can include liquids having a high heat capacity, such as water, brine, ethylene glycol, and the like; relatively pure phase transition cold storage materials, such as formic acid, 1, 2-dibromoethane, n-hexadecane, n-tetradecane, benzene, cyclohexane, and the like; inorganic salt hydrate materials, such as sodium chloride-sodium sulfate decahydrate, sodium manganate decahydrate; sodium chromate decahydrate, and the like.

In FIG. 3, an alternate form of the invention is illustrated wherein a plurality of cold storage units, 10, 10A, and 10B are employed in a cascaded arrangement. As in the previous embodiments of the invention, conventional fan 20 advances inlet air across a cooling unit 14 which includes cooling coil 16 disposed in heat exchange fins 18. The cooling coil forms a portion of a conventional air conditioning system which includes a conventional condenser 70 and compressor 72. The air cooled by cooling unit 14 is optionally advanced past heating unit 22 where all or a portion of the air is heated. The cool air is then advanced sequentially across cold storage units 10, 10A and 10B, with each of the cold storage units containing cold storage media having a phase transition temperature in increasing sequence. Thus, as illustrated in FIG. 3, the first cold storage unit contains media having a phase transition temperature at 55.5° F. The second cold storage unit 10A, contains media having a phase change temperature of 61.5° F. The third cold storage unit contains media having a phase change temperature of 70° F. The use of a cascaded, i.e. series mounted, plurality of gas hydrate units having different transition temperatures can substantially reduce the overall charging time of the system while retaining operation performance as disclosed in U.S. Pat. 4,922,998 to Carr. Preferably each of the cascade units comprises a group of individually sealed containers containing a gas hydrate as disclosed in the Carr patent. The gas hydrate contained in each group of containers will differ from the gas hydrate of the other groups.

Returning to FIG. 3, it is seen that cold liquid condensate collected in drip pan 24 is passed via insulated line 26 to reservoir 28 and thereafter passed via pump 32 through supply lines 34 and 36 for addition to the cooled air stream as appropriate. Thus, all or a portion of the collected condensate can be added as finely divided particles via a spray nozzle 38 disposed upstream of the first cooling unit 10. Alternatively, the liquid condensate can be sprayed directly onto each of the plurality of cold storage units 10, 10A, and 10B as illustrated in FIG. 3.

The air conditioning and cold storage systems of this invention can be used in various and diverse environments. Thus, the air conditioning and cold storage system of the invention can be used in air conditioning of a building enclosure wherein the cold storage medium, alone, is employed to air condition the building during peak electrical demand periods with the cold storage medium being cooled during periods of low electrical demand. In automotive systems, the cold storage and air conditioning system of the invention can be used to provide cooled air to a vehicle enclosure without operation of the vehicle condenser and compressor during periods of high engine power requirement or during periods when the engine is not running. In the trucking industry, the invention is particularly useful for cooling of the air within the truck cab during the night while the driver is sleeping. Thus, a cold storage reservoir unit of substantial mass can be provided and designed to be cooled over an eight hour time period while the truck is being driven. Then the engine can be turned off and the truck driver can rest in the vehicle cab with cooled air being supplied solely by the operation of a small fan moving air across the cold storage unit or units. Similarly, the cold storage air conditioning system of the invention can be incorporated into a recreational vehicle or RV, with the cold storage units being charged during driving of the RV. When the RV is parked, the charged cold storage medium can be employed to cool the interior of the RV enclosure.

The evaporative cooling enhanced system of this invention can be employed to improve operation and usefulness of cold storage systems in various ways. For example, because the system of the invention employs evaporative cooling in addition to cooling by indirect heat exchange with the air conditioned air, the cold storage units can be cooled at a substantially higher rate than when indirect heat exchange with cooled air, alone, is used. Because the cold storage units are being cooled at a higher rate, the cooled air flow requirements across the cold storage units can be substantially reduced. In turn, this can allow for a reduction in size and power consumption of the necessary air handling system. Moreover, as indicated previously, the system of this invention can allow the use of cold storage media having a lower phase change temperature than could be efficiently used in various prior art systems. Still further, the invention can be used to allow charging of cold storage units more rapidly or to allow charging of higher mass cold storage units in the same period of time as can be accomplished using various prior art cold storage air conditioning systems.

The following examples are provided in order to further illustrate the invention.

EXAMPLE 1

A commercial truck cab air conditioning system is modified to incorporate the cold storage air conditioning system according to the invention as illustrated in FIG. 1 thus providing the capability of cooling the cab and/or sleeper compartment without running of the track engine, e.g., while the driver sleeps. A gas hydrate unit comprising a plurality of individual units having a phase change temperature of 55° F. are employed. The cold storage unit is of a mass such that the unit has a total cold storage capacity of 12,000 Btu. The air conditioning system includes a cooling unit which cools inlet air to 40° F. Assuming that the driver wishes to fully charge the unit over a period of eight hours of driving, heat must therefore be removed from the cold storage array at 1,500 Btu/hr. over this eight hour period. It is also assumed that some heat loss through the vehicle duct work results in warming the cooled air to 45° C. as it reaches the cold storage unit. Based on the 10° F. difference between the cooled air temperature and the phase change temperature, an air flow rate of approximately 140 cfm (cubic feet per minute) will be required to fully charge the system over an eight hour period using only indirect heat transfer between the cooled air and the cold storage units (ideal heat transfer is assumed in all calculations).

Most environments generate an excess of water for the evaporative system to function. Even assuming a dry summer day in Phoenix, with daytime temperatures of 105° F. and a 25% relative humidity, of 100 cfm of fresh air drawn into the vehicle air conditioning system still yields approximately 2.7 lbs. of condensed water per hour. This represents 2,600 Btu's of potential evaporative cooling per hour and this level of cooling is well above that which is required for charging the sleeper cool storage system. Since the cold air from the vehicle evaporator is warmed somewhat as it passes through the duct system, the air reaching the cold storage unit can be expected to have a temperature of 45° F. but still a dew point of 40° F. The air then passes through a cold storage array of gas hydrate units and is warmed to the phase change temperature of 55° F. The air therefore has the potential of evaporating 0.0003 lb of water (40°-55° F.) per cu.ft. throughput. This represents 0.3 Btu of potential cooling and is in addition to the 0.18 Btu of sensible heat cooling (by indirect heat exchange) per cubic foot of air warmed from 45° F. to 55° F. In the ideal situation, if the total available sensible heat is used plus evaporative cooling is fully used by the system of the invention as illustrated in FIG. 1, then the 1,500 Btu/hr. of cooling can be accomplished at an air flow rate of 52 cfm as opposed to the 140 cfm required by sensible heat alone. This is an idealized calculation and in actual practice, the calculated air flow rate reduction can only be approached. However, it will be apparent that the gains by employing the system of the invention are nevertheless highly significant.

EXAMPLE 2

This example assumes the same air conditioning cooling unit, and gas hydrate thermal storage unit of Example 1. In this example, it is assumed that the driver elects to warm the air entering the cab to about 55° F. The warmer temperature setting chosen by the driver diverts some of the air through the heater module for rewarming. Since the driver has chosen to warm the air to the same temperature as the charging temperature of the cold storage unit, charging of the unit by phase change cannot occur under normal conditions by use of sensible heat alone. However, using the system of the present invention, and thus adding water sprayed into the air stream to provide entrainment vaporization or evaporation at the cold storage heat exchanger, cold storage charging can now occur at a rate of 0.3 Btu/cu.ft. of air throughput (as calculated in Example 1). This is a very acceptable charging rate for the cold storage unit. The minimum temperature attainable to facilitate nucleation according to this example is represented by the wet bulb temperature for 55° F. dry bulb air with a dew point of 40° F. This is approximately 47° F. which is considered more than sufficient to effect phase change of the gas hydrate storage medium. However, no phase change storage could have occurred without the addition of water provided by the method and apparatus of this invention.

EXAMPLE 3

In this example, a cascaded system as illustrated in FIG. 3 is employed. The system is modified to include the second water reservoir 44 illustrated in FIG. 1. The inlet air to the air conditioning system cooling coils is assumed to be 80° F. and to contain 0.009 lb. water per lb. of dry air (40 relative humidity or a dew point of 54° F.), with the air exiting the air conditioning cooling coils at 45° F. and containing 0.0065 lb. water per lb. dry air (100% relative humidity). Finally, the cooled air is passed over the cascaded cold storage array illustrated in FIG. 2 and therefore exits the array with an outlet equilibrium temperature of 70° F. The air is saturated with water as it passes through the array by nozzles 38 and therefore exits the array at 70° F. and contains 0.016 lb. of water/lb. of dry air (100% relative humidity or a dew point of 70° F.).

Under the above conditions the heat being removed by the air conditioning cooling coils is:

| | | |
|---|---|---|
| Sensible Heat = | (80−40) × 0.244 = | 8.5 |
| Latent Heat = | (.009−.0065) × 972 = | 2.4 |
| Total Heat Removed by Evaporator | | 10.9 Btu/lb air |

Heat removed from cool storage array is:

| | | |
|---|---|---|
| Sensible Heat = | (70−45) × 0.244 = | 6.1 |
| Latent Heat = | (.016−.0065) × 972 = | 9.2 |

| -continued | |
|---|---|
| Total Heat Removed from Cool Storage Array | 15.3 Btu/lb air |

It will be seen that more heat is being stored in the cold array than is being pumped by the air conditioning system. This is being accomplished by the addition of excess water from the combination of the condenser storage tank 28 and the additional water reservoir 44. As illustrated in this example, when the dew point of inlet air passed to the air conditioning system is lower than the dew point of the cooled air exiting the cold storage array (because of added evaporated water) then the overall efficiency of the air conditioning/cold storage system can be substantially improved. This system could be even more advantageously used when the air conditioning cooling coils serviced more than just the cold storage system and condensed enough water to fulfill the storage system added water requirements, thus eliminating the need for an extra water storage reservoir and providing all of the added water at a cool temperature equivalent to the temperature of the air conditioning condensing coils.

The invention has been described in considerable detail with specific reference to various preferred embodiments. It will be apparent however, that various modifications and changes can be made within the spirit and scope of the invention as described in the foregoing specification and defined in the appended claims.

That which is claimed is:

1. An air conditioning and cold storage process comprising the steps:
   (a) cooling a warm air stream;
   (b) passing the cooled air stream, in the presence of added moisture, in indirect heat exchange contact with a cold storage medium, the cold storage medium being at a temperature which is the same as or greater than the temperature of the cooled air stream to thereby vaporize at least a portion of the added moisture and effect enhanced cooling of the cold storage medium; and
   (c) recovering a cooled air stream comprising vaporized moisture from indirect heat exchange contact with the cold storage medium and passing the cooled air stream comprising vaporized moisture to an air conditioned enclosure.

2. The process of claim 1 wherein the cold storage medium comprises water and a liquified gas capable of forming a gas hydrate.

3. The process of claim 2 wherein the water and gas are provided within a plurality of sealed containers and further comprising at least one mechanical device positioned for free movement within each of said containers.

4. The process of claim 2 wherein the cold storage medium additionally comprises an emulsifier for enhancing mixing of the liquified gas and water.

5. The process of claim 1 further comprising the steps; collecting water condensed by cooling of the warm air stream in step (a), and thereafter adding at least a portion of the collected, condensed water to the cooled air stream prior to or during indirect heat exchange contact of the cooled air stream with the cold storage medium to provide said added moisture.

6. The process of claim 5 additionally comprising the steps of providing a separate reservoir of water and adding at least a portion of the water from the separate source to the cooled air stream prior to or during indirect heat exchange contact of the cooled air stream with the cold storage medium.

7. The process of claim 5 additionally comprising the step of heating at least a portion of the cooled air stream provided in step (a) prior to passing the cooled air stream into indirect heat exchange contact with the cold storage medium and prior to the addition of the collected, condensed water to the cooled air stream.

8. The process of claim 5 wherein the cold storage medium is provided as an array of a plurality of sealed containers containing a water and a gas capable of forming a gas hydrate.

9. The process of claim 5 wherein the cold storage medium is contained within a plurality of groups of individually sealed containers with the groups being disposed in a series arrangement, each group of individually sealed containers containing a hydrate forming gas which is different from the hydrate forming gas in at least one of the other groups of the containers and such that the hydrate forming transition temperature is not uniform among the groups.

10. The process of either of claim 8 wherein at least one movable device is provided within each of the individually sealed containers.

11. The process of claim 5 wherein at least a portion of the collected, condensed water is added to the cooled air stream by spraying the water into the cooled air stream prior to indirect heat exchange contact of the cooled air stream with the cold storage medium.

12. The process of claim 5 wherein at least a portion of the collected condensed water is added to the cooled air stream during indirect heat exchange contact of the cooled air stream with the cold storage medium.

13. The process of claim 1 wherein all or a portion of the cooled air stream comprising vaporized moisture recovered in step (c) is recirculated at least once through steps (a) and (b) prior to being passed to the air conditioned enclosure.

14. An air conditioning process comprising the steps:
   (a) cooling a warm air stream sufficiently to condense water out of the air stream and provide a cooled air stream;
   (b) collecting at least a portion of the condensate water condensed from cooling of the warm air stream;
   (c) passing the cooled air stream into contact with a unit containing a hydrate forming gas cold storage medium, the unit being at a temperature which is the same as or greater than the temperature of the cooled air stream; and
   (d) adding at least a portion of the collected condensate water to the cooled air stream prior to or during contact of the cooled air stream with the unit containing the hydrate forming gas cold storage medium.

15. The process of claim 14 additionally including the step of recovering the cooled air stream contacted with the unit containing the hydrate forming gas cold storage medium and passing the recovered cooled air stream into an air conditioned enclosure.

16. The process of claim 14 additionally comprising the steps of providing a source of water separate from the collected condensate water and adding the water from the separate source to the cooled air stream prior to or during contact of the cooled air stream with the unit containing the hydrate forming gas cold storage medium.

17. The process of claim 14 wherein the unit containing the hydrate forming gas cold storage medium is provided in the form of a plurality of individually sealed containers containing water and the hydrate forming gas.

18. The process of claim 17 additionally comprising at least one movable device positioned within each of the individually sealed containers.

19. The process of claim 14 wherein the hydrate forming gas cold storage medium additionally includes at least one emulsifying agent.

20. The process of claim 14 additionally comprising the step of recovering the cooled air stream contacted with the unit containing the hydrate forming gas cold storage medium and recirculating at least a portion of the cooled air stream to step (a).

21. An air conditioning and cold storage system comprising:
(a) air conditioning means cooling a warm air stream;
(b) cold storage means disposed downstream of the air conditioning means arranged for heat exchange contact with the cooled air stream;
(c) moisturizing means adapted and arranged for increasing the moisture content of the cooled air stream prior to or during heat exchange contact of the cooled air stream with the cold storage means; and
(d) recovery and supply means for recovering cooled air having an increased moisture content from contact with the cold storage means and for supplying the cooled air having increased moisture content to an air conditioned enclosure.

22. The system of claim 21 further comprising condensate collecting means for collecting water condensed by the air conditioning means and supply means for supplying at least a portion of the water collected by the condensate collection means to the moisturizing means.

23. The system of claim 21 wherein the supply means comprises an insulated supply line connected to the moisturizing means and a pump for pumping condensate through the insulated supply line to the moisturizing means.

24. The system of claim 21 wherein the cold storage means comprises a plurality of individually sealed containers containing water and a gas capable of forming a gas hydrate with the water.

25. The system of claim 24 further comprising movable means positioned within each of the containers for providing mechanical movement within the containers.

26. The system of claim 24 wherein the water and gas in the containers additionally comprises an emulsifying agent.

27. The system of claim 21 additionally comprising a recirculation means for recirculating all or a portion of the cooled air having increased moisture content recovered in step (d) to the air conditioning means.

28. The system of claim 21 further comprising a second water supply means connected to the moisturizing means for supplying water to the moisturizing means.

29. An air conditioning and cold storage system comprising:
(a) an air duct;
(b) an air conditioning means comprising a cooling coil positioned within the air duct for providing a cooled air stream through the air duct;
(c) cold storage means disposed in the air duct downstream of the cooling coil and arranged for heat exchange contact with the cooled air stream from the cooling coil; and
(d) a spray nozzle connected to a water supply source, the spray nozzle being disposed in the air duct and positioned to spray water onto the cold storage means.

30. The system of claim 29 wherein the cold storage means comprises a plurality of individually sealed containers containing a cold storage medium.

31. The system of claim 29 further comprising condensate collecting means for collecting moisture condensate condensed by the cooling coil in the air duct, the condensate collecting means constituting all or a portion of the water supply connected to the spray nozzle disposed in the air duct.

32. The system of claim 31 wherein the cold storage medium is a cold storage phase change medium.

33. The system of claim 32 wherein the cold storage medium comprises water and a gas capable of forming a gas hydrate with the water.

34. The system of claim 33 wherein the cold storage medium additionally comprises an emulsifying agent.

35. The system of claim 33 wherein the individually sealed containers comprise a movable means positioned within each of the containers for providing mechanical movement within the sealed container.

36. A vehicle air conditioning and cold storage system comprising:
(a) an air duct including a fan for advancing air therethrough;
(b) air conditioning means including a cooling coil in the duct for cooling the air as it advances through the duct;
(c) condensate collecting means connected to the cooling coil for collecting moisture condensate from the cooling coil;
(d) a heating means positioned within the duct downstream of the cooling coil operable for heating all or a portion of the air flowing through the duct;
(e) cold storage means disposed in the duct downstream of the heating means and arranged for heat exchange contact with air flowing through the duct, the cold storage means including a gas hydrate cold storage medium; and
(f) moisturizing means disposed within the duct downstream of the heating means and upstream of or adjacent the cold storage means, the moisturizing means being connected to the condensate collecting means and adapted to add all or a portion of the condensate collected by the condensate collecting means to air flowing through the duct.

37. The system of claim 36 wherein the cold storage means comprises a plurality of individually sealed containers, each of the containers containing water and a gas capable of forming a gas hydrate with the water.

38. The system of claim 37 wherein each of the sealed containers additionally includes a movable means positioned inside of the container.

39. The system of claim 37 wherein each of the containers additionally contain an emulsifying agent.

40. The system of claim 35 wherein the cold storage means comprises a plurality of groups of individually sealed containers, each of the containers containing water and a gas capable of forming a gas hydrate with the water and with the containers of each group having a hydrate forming gas which is different from the hydrate forming gas in at least one of the other groups of containers such that the hydrate forming transition temperature is not uniform among the groups.

* * * * *